(12) United States Patent
Chuah

(10) Patent No.: US 6,315,934 B1
(45) Date of Patent: *Nov. 13, 2001

(54) PROCESS FOR PREPARING POLY (THIMETHYLENE THEREPHTHALATE) CARPET YARN

(75) Inventor: Hoe Hin Chuah, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/411,994

(22) Filed: Oct. 4, 1999

Related U.S. Application Data

(62) Division of application No. 09/145,173, filed on Sep. 1, 1998, now Pat. No. 6,254,961, which is a division of application No. 08/969,726, filed on Nov. 13, 1997, now Pat. No. 6,113,825, which is a continuation of application No. 08/538,695, filed on Oct. 3, 1995, now abandoned, which is a continuation-in-part of application No. 08/435,065, filed on May 8, 1995, now abandoned.

(51) Int. Cl.[7] .............................. D01D 5/16; D01F 6/62; D02G 3/02
(52) U.S. Cl. .................. 264/103; 28/271; 264/210.7; 264/210.8; 264/211.12; 264/211.14
(58) Field of Search ................. 264/103, 210.7, 264/210.8, 211.12, 211.14; 28/271

(56) References Cited

U.S. PATENT DOCUMENTS

| | | |
|---|---|---|
| 5,645,782 | 7/1997 | Howell et al. ............... 264/103 |
| 5,662,980 | 9/1997 | Howell et al. ............... 428/88 |
| 6,113,825 * | 9/2000 | Chuah ........................ 264/103 |

* cited by examiner

*Primary Examiner*—Leo B. Tentoni

(57) ABSTRACT

Poly(trimethylene terephthalate) is formed into a bulk continuous filament yarn by a process including:

(a) melt-spinning poly(trimethylene terephthalate) at a temperature within the range of about 240 to about 280° C. to produce a plurality of spun filaments;

(b) cooling the spun filaments;

(c) converging the spun filaments into a yarn;

(d) drawing the yarn at a first draw ratio within the range of about 1.01 to about 2 in a first drawing stage defined by at least one feed roller and at least one first draw roller, each of said at least one feed roller operated at a temperature less than about 100° C. and each of said at least one draw roller heated to a temperature greater than the temperatures of said at least one feed roller and within the range of about 50 to about 150° C.;

(e) subsequently drawing the yarn at a second draw ratio of at least about 2.2 times that of the first draw ratio in a second drawing stage defined by said at least one first draw roller and at least one second draw roller, each of said at least one second draw roller heated to a temperature greater than said at least one first draw roller and within the range of about 100 to about 200° C.; and (e) winding the drawn yarns, after optionally texturing the drawn yarns.

The invention process enables the production of poly(trimethylene terephthalate)-based carpet having the bulk and resiliency of nylon as well as the stain resistance and low static generation of polyester.

5 Claims, 1 Drawing Sheet

PROCESS FOR PREPARING POLY (THIMETHYLENE THEREPHTHALATE) CARPET YARN

CROSS-REFERENCE TO RELATED APPLICATION

This is a division of application Ser. No. 09/145,173, filed Sep. 1, 1998 now U.S. Pat. No. 6,254,961, which is a division of application Ser. No. 08/969,726, filed Nov. 13, 1997, now U.S. Pat. No. 6,113,825, which is a continuation of application Ser. No. 08/538,695, filed Oct. 3, 1995, now abandonded, which is a continuation-in-part of application Ser. No. 08/435,065, filed May 8, 1995 now abandoned.

BACKGROUND OF THE INVENTION

This invention relates to the spinning of synthetic polymeric yarns. In a specific embodiment, the invention relates to spinning poly(trimethylene terephthalate) into yarn suitable for carpets.

Polyesters prepared by condensation polymerization of the reaction product of a diol with a dicarboxylic acid can be spun into yarn suitable for carpet fabric. U.S. Pat. No. 3,998,042 describes a process for preparing polytethylene terephthalate) yarn in which the extruded fiber is drawn at high temperature (160° C.) with a steam jet assist, or at a lower temperature (95° C.) with a hot water assist. Poly (ethylene terephthalate) can be spun into bulk continuous filament (BCF) yarn in a two-stage drawing process in which the first stage draw is at a significantly higher draw ratio than the second stage draw. U.S. Pat. No. 4,877,572 describes a process for preparing poly(butylene terephthalate) BCF yarn in which the extruded fiber is drawn in one stage, the feed roller being heated to a temperature 30° C. above or below the Tg of the polymer and the draw roller being at least 100° C. higher than the feed roll. The application of conventional polyester spinning processes to prepare poly(trimethylene terephthalate) BCF results in yarn which is of low quality and poor consistency. It would be desirable to have a process for preparing high-quality BCF carpet yarn from poly(trimethylene terephthalate).

It is therefore an object of the invention to provide a process for preparing high-quality bulk continuous filament yarn from poly(trimethylene terephthalate).

SUMMARY OF THE INVENTION

According to the invention, poly(trimethylene terephthalate) is formed into a bulk continuous filament yarn by a process comprising:

(a) melt-spinning poly(trimethylene terephthalate) at a temperature within the range of about 240° to about 280° C. to produce a plurality of spun filaments;

(b) cooling the spun filaments;

(c) converging the spun filaments into a yarn;

(d) drawing the yarn at a first draw ratio within the range of about 1.01 to about 2 in a first drawing stage defined by at least one feed roller and at least one first draw roller, each of said at least one feed roller operated at a temperature less than about 100° C. and each of said at least one draw roller heated to a temperature greater than the temperature of said at least one feed roller and within the revue of about 50 to about 150° C.;

(e) subsequently drawing the yarn at a second draw ratio of at least about 2.2 times that of the first draw ratio in a second drawing stage defined by said at least one first draw roller and at least one second draw roller, each of said at least one second draw roller heated to a temperature greater than said at least one first draw roller and within the range of about 100 to about 200° C.; and (f) winding the drawn yarn.

The process may optionally include texturing the drawn yarn prior to or after winding step (f).

The process of the invention permits the production of poly(trimethylene terephthalate) bulk continuous filament yarn suitable for high-quality carpet.

DETAILED DESCRIPTION OF THE INVENTION

Figures 1, 2:
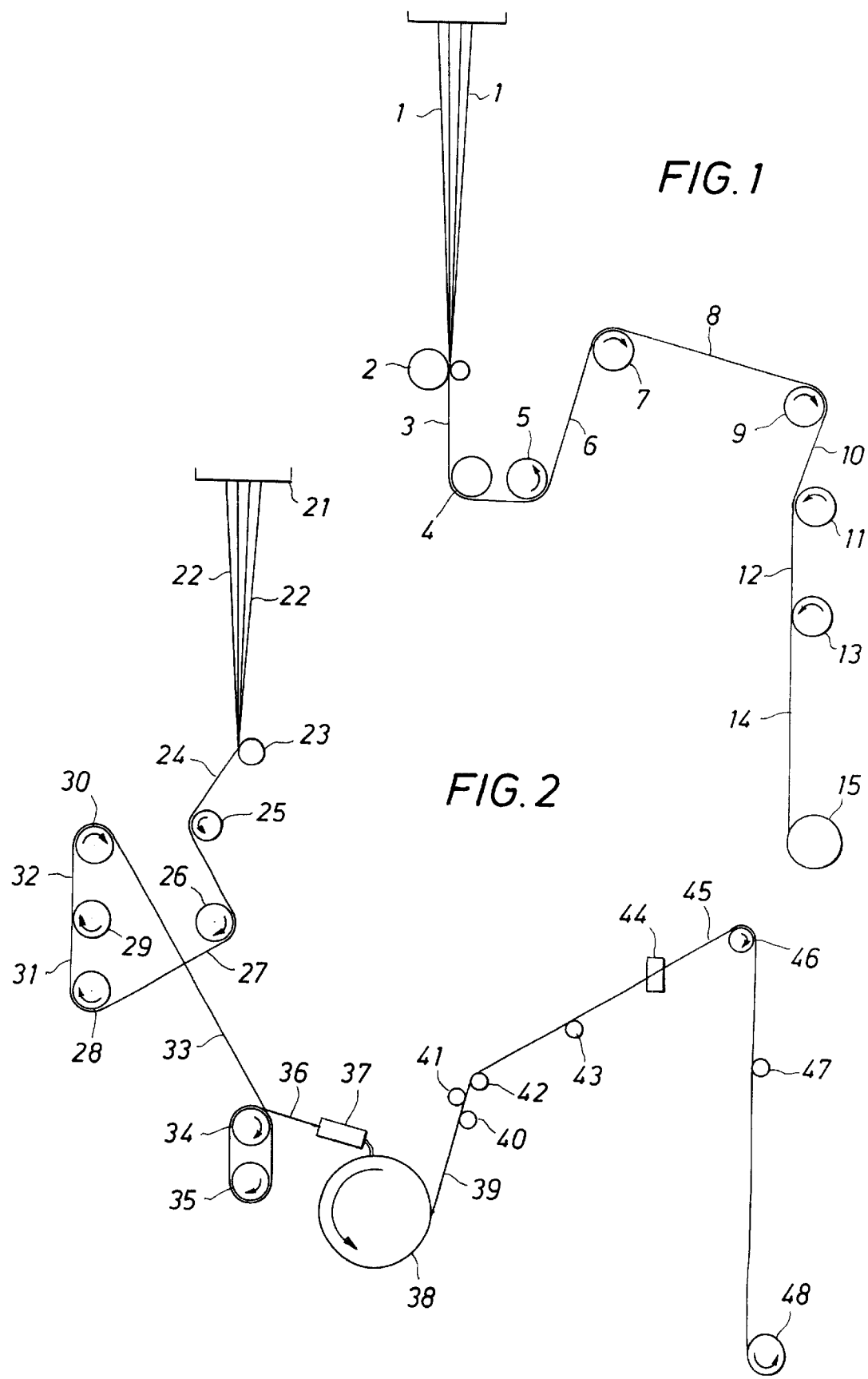
FIG. 1 is a schematic diagram of one embodiment of the invention yarn preparation process.
FIG. 2 is a schematic diagram of a second embodiment of the invention process.

The fiber-spinning process is designed specifically for poly(trimethylene terephthalate), the product of the condensation polymerization of the reaction product of trimethylene diol (also called "1,3-propane diol") and a terephthalic acid or an ester thereof, such as terephthalic acid and dimethyl terephthalate. The poly(trimethylene terephthalate) may be derived from minor amounts of other monomers such as ethane diol and butane diol as well as minor amounts of other diacids or diesters such as isophthalic acid. Poly (trimethylene terephthalate) having an intrinsic viscosity (i.v.) within the range of about 0.8 to about 1.0 dl/g, preferably about 0.86 to about 0.96 dl/g (as measured in a 50/50 mixture of methylene chloride and trifluoroacetic acid at 30° C.) and a melting point within the range of about 215 to about 230° C. is particularly suitable. The moisture content of the poly(trimethylene terephthalate) should be less than about 0.005% prior to extrusion. Such a moisture level can be achieved by, for example, drying polymer pellets in a dryer at 150–180° C. until the desired dryness has been achieved.

One embodiment of the invention process can be described by reference to FIG. 1. Molten poly(trimethylene terephthalate) which has been extruded through a spinneret into a plurality of continuous filaments 1 at a temperature within the range of about 240 to about 280° C., preferably about 250 to about 270° C., and then cooled rapidly, preferably by contact with cold air, is converged into a multifilament yarn and the yarn is passed in contact with a spin finish applicator, shown here as kiss roll 2. Yarn 3 is passed around denier control rolls 4 and 5 and then to a first drawing stage defined by feed roll 7 and draw roll 9. Between rolls 7 and 9, yarn 8 is drawn at a relatively low draw ratio, within the range of about 1.01 to about 2, preferably about 1.01 to about 1.35. Roller 7 is maintained at a temperature less than about 100° C., preferably within the range of about 40 to about 85° C. Roller 7 can be an unheated roll, in which case its temperature of operation will be somewhat elevated (30–45° C.) due to friction and the temperature of the spun fiber. Roller 9 is maintained at a temperature within the range of about 50 to about 150° C., preferably about 90 to about 140° C.

Drawing speeds of greater than 1000 m/min. are possible with the invention process, with drawing speeds greater than 1800 m/min. desirable because of the high tenacity of the resulting yarn.

Drawn yarn 10 is passed to a second drawing stage, defined by draw rolls 9 and 11. The second-stage draw is carried out at a relatively high draw ratio with respect to the first-stage draw ratio, generally at least about 2.2 times that of the first stage draw ratio, preferably at a draw ratio within the range of about 2.2 to about 3.4 times that of the first stage. Roller 11 is maintained at a temperature within the range of about 100 to about 200° C. In general, the three rollers will be sequentially higher in temperature. The selected temperature will depend upon other process variables, such as whether the BCF is made with separate drawing and texturing steps or in a continuous draw/texturing process, the effective heat transfer of the rolls used, residence time on the roll, and whether there is a second heated roll upstream of the texturing jet. Drawn fiber 12 is passed in contact with optional relax roller 13 for stabilization of the drawn yarn. Stabilized yarn 14 is passed to optional winder 15 or is sent directly to the texturing process.

The drawn yarn is bulked by suitable means such as a hot air texturing jet. The preferred feed roll temperature for texturing is within the range of about 150 to about 220° C. The texturing air jet temperature is generally within the range of about 150 to about 210° C., and the texturing jet pressure is generally within the range of about 50 to about 120 psi to provide a high-bulk BCF yarn. Wet or superheated steam can be substituted for hot air as the bulking medium.

FIG. 2 shows a second embodiment of the two-stage drawing process showing texturing steps downstream of the drawing zone. Molten poly(trimethylene terephthalate) is extruded through spinneret 21 into a plurality of continuous filaments 22 and is then quenched by, for example, contact with cold air. The filaments are converged into yarn 24 to which spin finish is applied at 23. Yarn 27 is advanced to the two-stage draw zone via rolls 25 and 26, which may be heated or non-heated.

In the first draw stage, yarn 31 is drawn between feed roll 28 and draw roll 29 at a draw ratio within the range of about 1.01 and about 2. Drawn yarn 32 is then subjected to a second draw at a draw ratio at least about 2.2 times the first draw ratio, preferably a draw ratio within the range of about 2.2 to about 3.4 times that of the first draw. The temperature of roll 28 is less than about 100° C. The temperature of draw roll 29 is within the range of about 50 to about 150° C. The temperature of draw roll 30 is within the range of about 100 to about 200° C. Drawn yarn 33 is advanced to heated rolls 34 and 35 to preheat the yarn for texturing. Yarn 36 is passed through texturing air jet 37 for bulk enhancement and then to jet screen cooling drum 38. Textured yarn 39 is passed through tension control 40, 41 and 42 and then via idler 43 to optional entangler 44 for yarn entanglement if desired for better processing downstream. Entangled yarn 45 is then advanced via idler 46 to an optional spin finish applicator 47 and is then wound onto winder 48. The yarn can then be processed by twisting, texturing and heat-setting as desired and tufted into carpet as is known in the art of synthetic carpet manufacture.

Poly(trimethylene terephthalate) yarn prepared by the invention process has high bulk (generally within the range of about 20 to about 45%, preferably within the range of about 26 to about 35%), resilience and elastic recovery, and is useful in the manufacture of carpet, including cut-pile, loop-pile and combination-type carpets, mats and rugs. Poly(trimethylene terephthalate) carpet has been found to exhibit good resiliency, stain resistance and dyability with disperse dyes at atmospheric boil with optional carrier.

EXAMPLE 1

Effect of Intrinsic Viscosity on Poly(trimethylene terephthalate) Fiber Drawing

Four poly(trimethylene terephtlialate) polymers having intrinsic viscosities of 0.69, 0.76, 0.84 and 0.88 dl/g, respectively, were each spun into 70 filaments with trilobal cross-sections using a spinning machine having a take-up and drawing configuration as shown in FIG. 1. Roll 1 (see detail below) was a double denier control roll; roll 2 ran at a slightly higher speed to maintain a tension and act as a feed roll for drawing. First stage drawing took place between rolls 2 and 3, and second-stage drawing took place between rolls 3 and 4. The drawn yarn contacted relax roll 5 prior to wind-up. The spin finish was a 15% Lurol PF 4358-15 solution from G.A. Goulston Company applied with a kiss roll.

Fiber extrusion and drawing conditions for each polymer were as follows:

| Extrusion Conditions | | | |
|---|---|---|---|
| Polymer IV (dl/g): | Units | 0.84, 0.80 | 0.69, 0.76 |
| Extruder Temp. Profile: | | | |
| Zone 1 | ° C. | 230 | 225 |
| Zone 2 | ° C. | 250 | 235 |
| Zone 3 | ° C. | 250 | 235 |
| Zone 4 | ° C. | 250 | 235 |
| Melt Temp. | ° C. | 255 | 240 |
| Extrusion Pack Pressure | psi | 1820–2820 | 500–1300 |
| Denier Control Roll Speed | m/min. | 225 | 220 |
| Fiber Drawing Conditions | | | |
| Polymer IV (dl/g) | 0.88 | 0.84 | 0.76 | 0.69 |
| Roll Temp.: ° C. | | | | |
| Roll 2 | 80 | 80 | 80 | 80 |
| Roll 3 | 95 | 95 | 95 | 95 |
| Roll 4 | 155 | 155 | 155 | 155 |
| Roll 5 | RT | RT | RT | RT |
| Roll Speeds: m/min. | | | | |
| Roll 2 | 230 | 230 | 230 | 230 |
| Roll 3 | 310 | 310 | 404 | 404 |
| Roll 4 | 1020 | 1165 | 1089 | 1089 |
| Roll 5 | 1035 | 1102 | 1075 | 1075 |
| First Stage Draw Ratio | 1.35 | 1.35 | 1.76 | 1.76 |
| Second Stage Draw Ratio | 3.29 | 3.29 | 2.70 | 2.70 |

Fiber tensile properties are shown in Table 1.

TABLE 1

| Run | I.V. (dl/g) | Yarn Count (den.) | Tenacity (g/den.) | % Elongation |
|---|---|---|---|---|
| 1 | 0.69 | 1182 | 1.51 | 70.7 |
| 2 | 0.76 | 1146 | 1.59 | 79.7 |
| 3 | 0.84 | 1167 | 2.03 | 89.0 |
| 4 | 0.88 | 1198 | 2.24 | 67.5 |

Poly(trimethylene terephthalate) of intrinsic viscosities 0.69 and 0.76 (Runs 1 and 2) gave yarn of inferior tensile properties compared with the yarn of Runs 3 and 4. These polymers were re-spun at a lower extruder temperature profile. Although they could be spun and drawn, the fibers had high die swell. When the fiber cross-sections were examined with an optical microscope, the 0.69 i.v. fibers swelled to a point that they were no longer trilobal in shape and resembled delta cross-sections. They also had relatively low tenacity.

EXAMPLE 2
Two-Stage Drawing of PTT Fibers 0.88 i.v. poly(trimethylene terephthalate) was extruded into 72 filaments having trilobal cross-section using a fiber-spinning machine having take-up and drawing configurations as in Example 1. Spin finish was applied as in Example 1. Extrusion and drawing conditions were as follows.

| Extrusion Conditions | | |
|---|---|---|
| Extruder Temperature Profile: | Units | |
| Zone 1 | °C. | 230 |
| Zone 2 | °C. | 260 |
| Zone 3 | °C. | 260 |
| Zone 4 | °C. | 260 |
| Melt Temp. | °C. | 265 |
| Denier Control Roll Speed | m/min. | 230 |

Drawing and texturing conditions were as follows.

| Drawing Conditions | | |
|---|---|---|
| Rolls | Temperature, °C. | Speed, m/min. |
| Roll 1 | RT | 225 |
| Roll 2 | 80 | 230 |
| Roll 3 | 95 | 264 |
| Roll 4 | 90 | 1058 |
| Roll 5 | 110 | 1042 |
| Texturing Conditions | | |
| Feed Roll Temperature, °C. | | 180 |
| Feed Roll Speed, m/min. | | 980 |
| Air Jet Temperature, °C. | | 180 |
| Interlacing Pressure, psi | | 10 |

| Fiber Drawing Conditions | | | | | | | | |
|---|---|---|---|---|---|---|---|---|
| | | Runs | | | | | | |
| | Units | 5 | 6 | 7 | 8 | 9 | 10 | 11 |
| Roll 2 Temp./Speed | °C./m/min | 80/235 | 80/235 | 100/235 | 100/235 | 100/235 | 100/235 | 100/235 |
| Roll 3 Temp./Speed | °C./m/min | 90/317 | 100/286 | 100/817 | 100/817 | 100/817 | 100/993 | 100/945 |
| Roll 4 Temp./Speed | °C./m/min | 155/1123 | 100/1021 | 155/1047 | 140/1103 | 140/1145 | 130/1044 | 140/996 |
| Roll 5 Temp./Speed | °C./m/min | RT/1096 | RT/1011 | RT/1029 | RT/1082 | RT/1134 | RT/1019 | RT/981 |
| 1st Stage Draw Ratio | | 1.35 | 1.22 | 3.48 | 3.48 | 3.48 | 4.23 | 4.02 |
| 2nd Stage Draw Ratio | | 3.55 | 3.57 | 1.28 | 1.35 | 1.40 | 1.05 | 1.05 |
| Total Draw Ratio | | 4.79 | 4.36 | 4.45 | 4.70 | 4.87 | 4.44 | 4.22 |
| Yarn Count, den. | den. | 1225 | 1281 | 1275 | 1185 | | 1210 | 1288 |
| Tenacity, g/den. | g/den. | 1.95 | 1.95 | 1.61 | 1.32 | | 1.85 | 1.11 |
| Elongation | % | 55 | 75 | 70 | 76 | | 78 | 86 |

It was observed during spinning and drawing that, when the first-stage draw ratio (between rolls 2 and 3) was less than about 1.5, as in Runs 5 and 6, there were fewer broken filaments and the tenacities of the filaments were generally higher than when first-stage draw was higher than about 1.5. When the first-stage draw was increased to greater than 3 (Runs 7, 8, 9, 10, and 11), it was observed that the fibers had a white streaky appearance, the threadlines were loopy, and there were frequent filament wraps on the draw rolls. The process was frequently interrupted with fiber breaks.

EXAMPLE 3
Spinning, Drawing and Texturing Poly(trimethylene terephthalate) BCF to High Bulk The extrusion conditions in this experiment were the same as in Example 2. The fibers were spun, drawn and wound as in Example 1. They were then textured by heating the fibers on a feed roll and exposing the fibers to a hot air jet. The textured fibers were collected as a continuous plug on a jet-screen cooling drum. Partial vacuum was applied to the drum to pull the ambient air to cool the yarns and keep them on the drum until they were wound. The yarns were air entangled between the drum and the winder. The feed roll and texturizer air jet temperatures were kept constant, and the air jet pressure was varied from 50 to 100 psi to prepare poly(trimethylene terephthalate) BCF of various bulk levels.

Yarn bulk and shrinkage were measured by taking 18 wraps of the textured yarn in a denier creel and tying it into a skein. The initial length $L_0$ of the skein was 22.1 inches in English unit creel. A 1 g weight was attached to the skein and it was hung in a hot-air oven at 130° C. for 5 minutes. The skein was removed and allowed to cool for 3 minutes. A 50 g weight was then attached and the length $L_1$ was measured after 30 seconds. The 50 g weight was removed, a 10 Lb weight was attached, and the length $L_2$ was measured after 30 seconds. Percent bulk was calculated as $(L_0-L_1)/L_0 \times 100\%$ and shrinkage was calculated as $(L_0-L_2)/L_0 \times 100\%$. Results are shown in Table 2.

TABLE 2

| Package No. | Yarn Count, den. | % Bulk | % Shrinkage |
|---|---|---|---|
| T50 | 1437 | 32.6 | 3.6 |
| T60 | 1406 | 35.7 | 2.7 |
| T70 | 1455 | 39.4 | 3.2 |
| T80 | 1500 | 38.0 | 3.6 |
| T90 | 1525 | 37.6 | 4.1 |
| T100 | 1567 | 38.0 | 3.6 |

The experiment showed that poly(trimethylene terephthalate) BCF can be textured to high bulk with a hot air texturizer.

EXAMPLE 4
Carpet Resiliency Comparison

Poly(trimethylene terephthalate) BCF yarns were made in two separate steps: (1) spinning and drawing set-up as in Example 1 and (2) texturing. Extrusion, drawing and texturing conditions for the poly(trimethylene terephthalate) yarns were as follows.

| Extrusion Conditions | | |
|---|---|---|
| Extruder Temperature | Units | |
| Zone 1 | ° C. | 240 |
| Zone 2 | ° C. | 255 |
| Zone 3 | ° C. | 255 |
| Zone 4 | ° C. | 255 |
| Melt Temperature | ° C. | 260 |
| Pack Pressure | psi | 1830 |

| Drawing Condition B | | |
|---|---|---|
| | Units | |
| Roll 1 Temp. | ° C./m/min. | RT/223 |
| Roll 2 Temp. | ° C./m/min. | 80/230 |
| Roll 3 Temp. | ° C./m/min. | 95/288 |
| Roll 4 Temp. | ° C./m/min. | 150/1088 |
| Roll 5 Temp. | ° C./m/min. | RT/1000 |

| Texturing Conditions | | |
|---|---|---|
| | Units | |
| Feed Roll Temp. | ° C. | 180 |
| Feed Roll Speed | m/min. | 980 |
| Air Jet Temp | ° C. | 180 |
| Air Jet Pressure | psi | 90 |
| Interlacing Pressure | psi | 10 |

The yarn produced was 1150 denier with 2.55 g/deni tenacity and 63% elongation. The textured yarn was twisted, heat set as indicated, and tufted into carpets. Performances of the poly(trimethylene terephthalate) carpets were compared with a commercial 1100 denier nylon 66 yarn. Results are shown in Table 3.

TABLE 3

| Run | Twist/Inch | Heat Setting Conditions | Accelerated Floor Traffic Rating | % Loss in Pile Thickness |
|---|---|---|---|---|
| 12 (Poly(trimethylene terephthalate) | 4.5 × 4.5 | 270° F. Autoclave | 3.75 | 2.4 |
| 13 (Poly(trimethylene terephthalate) | 4.5 × 4.5 | 180° C. Seussen | 3.5 | 7.1 |
| 14 (Poly(trimethylene terephthalate) | 5.0 × 5.0 | 270° F. Autoclave | 3.75 | 1.7 |
| 15 nylon 66 | 4.0 × 4.0 | 270° F. Autoclave | 3.0 | 6.4 |
| 16 nylon 66 | 4.0 × 4.0 | 190° C. Seussen | 3.5 | 4.5 |

The heat-set yarns were tufted into 24 oz. cut-pile Saxony carpets in 1/8" gauge, 9/16" pile height, and dyed with disperse blue 56 (without a carrier) at atmospheric boil into medium blue color carpets Visual inspection of the finished carpets disclosed that the poly(trimethylene terephthalate) carpets (Runs 12, 13 and 14) had high bulk and excellent coverage which were equal to or better than the nylon controls (Runs 15 and 16). Carpet resiliency was tested in accelerated floor trafficking with 20,000 footsteps. The appearance retention was rated 1 (severe change in appearance), 2 (significant change), 3 (moderate change), 4 (slight change) and 5 (no change). As can be seen in Table 3, the poly(trimethylene terephthalate) carpets were equal to or better than the nylon 66 controls in the accelerated walk tests and in percent thickness loss.

EXAMPLE 5

One-Step Processing of (Polytrimethylene terephthalate) BCF Yarn from Spinning to Texturing Poly(trimethylene terephthalate) (i.v. 0.90) was extruded into 72 trilobal cross-section filaments. The filaments were processed on a line as shown in FIG. 2 having two cold rolls, three draw rolls and double yarn feed rolls prior to texturing. The yarns were textured with hot air, cooled in a rotating jet screen drum and wound up with a winder. Lurol NF 3278 CS (G.A. Goulston Co.) was used as the spin finish. Texturing conditions were varied to make poly(trimethylene terephthalate) BCF yarns having different bulk levels. Extrusion, drawing, texturing and winding conditions were as follows.

| Extrusion Conditions | | |
|---|---|---|
| Extruder Temperature Profiles | Units | |
| Zone 1 | ° C. | 240 |
| Zone 2 | ° C. | 260 |
| Zone 3 | ° C. | 260 |
| Zone 4 | ° C. | 265 |
| Melt Temperature | ° C. | 265 |
| Pump Pressure | psi | 3650 |

| Drawing Conditions | | |
|---|---|---|
| | Temperature ° C. | Speed, m/min. |
| Cold Roll 1 | RT | 211 |
| Cold Roll 2 | RT | 264 |
| Draw Roll 1 | 50 | 290 |
| Draw Roll 2 | 90 | 330 |
| Draw Roll 3 | 110 | 1100 |

The yarns were twisted, heat set and tufted into carpets for performance evaluation. Results are shown in Table 4.

TABLE 4

| Sample Number | Feed Roll Temp., ° C. | Texturizing Jet Temp., ° C. | Texturizing Jet Press., psi | Yarn Count, den. | % Bulk | % Shrinkage | Accelerated Walk Test Rating |
|---|---|---|---|---|---|---|---|
| 1 | 150 | 180 | 70 | 1490 | 19.2 | 1.58 | 3.25 |
| 2 | 150 | 180 | 110 | 1420 | 26 | 1.59 | 3.5 |
| 3 | 150 | 200 | 110 | 1546 | 30.5 | 1.59 | 3.0 |
| 4 | 180 | 180 | 70 | 1429 | 24.6 | 2.04 | 3.0 |
| 5 | 180 | 180 | 110 | 1495 | 29.8 | 1.81 | 3.5 |

TABLE 4-continued

| Sample Number | Feed Roll Temp, ° C. | Texturizing Jet Temp., ° C. | Texturizing Jet Press., psi | Yarn Count, den. | % Bulk | % Shrinkage | Accelerated Walk Test Rating |
|---|---|---|---|---|---|---|---|
| 6 | 180 | 200 | 70 | 1475 | 26.5 | 1.36 | 2.75 |
| 7 | 180 | 200 | 110 | 1554 | 32.8 | 0.86 | 3.0 |
| 8 | 150 | 190 | 90 | 1482 | 26 | 2.31 | 3.25 |
| 9 | 180 | 190 | 90 | 1430 | 29 | 1.58 | 3.5 |
| 10 | 165 | 190 | 90 | 1553 | 29 | 2.26 | 3.75 |
| Nylon 6 | | | | | | | 3.5 |
| Nylon 66 | | | | | | | 3.5 |

EXAMPLE 6

Effects of Draw Ratio and Roll Temperature on Yarn Properties

Poly(trimethylene erephthalate) (0.90 i.v.) was spun into 72 filaments with trilobal cross-sections using a machine as described in Example 5. Extrusion conditions were as follows.

| Extrusion Conditions | | |
|---|---|---|
| Extruder Temperature Profiles | Units | |
| Zone 1 | ° C. | 240 |
| Zone 2 | ° C. | 260 |
| Zone 3 | ° C. | 260 |
| Zone 4 | ° C. | 260 |
| Melt Temperature | ° C. | 260 |

The poly(trimethylene terephthalate) BCF yarns and commercial nylon 6 and 66 yarns were tufted into 32 oz. 5/32 gauge cut-pile Saxony carpets having 20/32" pile height. They were walk-tested with 20,000 footsteps accelerated floor trafficking for resiliency Lnd appearance retention comparisons. Roll conditions and results are shown in Table 5.

EXAMPLE 7

Use of Low First-Stage Draw Ratio

Poly(trimethylene terephthalate) (0.9 i.v.) was spun into 69 filaments with trilobal cross-sections using a drawing and texturing configuration simailar to that shown in FIG. 1, with the yarn passing via unheated haul-off Roll 1, first-stage draw between Roll 1 and draw Roll 2, and second-stage draw between Roll 2 and dual Roll 3. The drawn yarns were then textured, relaxed and wound up. Extrusion conditions were as follows.

TABLE 5

| Sample: | | 1 | 2 | 3 | 4 | 5 | nylon 6 | nylon 66 |
|---|---|---|---|---|---|---|---|---|
| Roll 1 Temp. | ° C. | 50 | 50 | 50 | 50 | 50 | | |
| Roll 2 Temp. | ° C. | 90 | 90 | 90 | 90 | 90 | | |
| Roll 3 Temp. | ° C. | 110 | 110 | 110 | 150 | 150 | | |
| Roll 1 Speed | m/min. | 290 | 290 | 290 | 290 | 290 | | |
| Roll 2 Speed | m/min. | 330 | 330 | 330 | 330 | 330 | | |
| Roll 3 Speed | m/min. | 1000 | 1100 | 1150 | 1100 | 1000 | | |
| Draw Ratio | | 3.45 | 3.79 | 3.97 | 3.97 | 3.45 | | |
| Feed Roll Temp. | ° C. | 165 | 165 | 165 | 165 | 165 | | |
| Feed Roll Speed | m/min. | 1000 | 1100 | 1150 | 1100 | 1000 | | |
| Texturing Jet Temp. | ° C. | 190 | 190 | 190 | 190 | 190 | | |
| Texturing Jet Pressure | psi | 90 | 90 | 90 | 90 | 90 | | |
| Interlacing Pressure | psi | 30 | 30 | 30 | 30 | 30 | | |
| Bulk | % | 26.1 | 31.6 | 31.9 | 35.8 | 33 | | |
| Shrinkage | % | 1.75 | 2.04 | 2.13 | 2.26 | 1.92 | | |
| Walk Test Rating | | 4.0 | 3.5 | 3.5 | 3.5 | 3.5 | 3.5 | 3.5 |

| Extrusion Conditions | | |
|---|---|---|
| Extruder Temp. Profiles | Trial 1 | Trial 2 |
| Zone 1 | 230° C. | 230 |
| Zone 2 | 260 | 245 |
| Zone 3 | 260 | 255 |
| Zone 4 | 260 | 255 |

The speed and temperature of the rolls, texturing conditions and yarn tensile properties are shown in Table 6. In Trial 1, the relax roll was a single roll with a follower, and in Trial 2, the relax roll was a dual roll. The spin finish was Goulston Lurol 3919 applied as a 25–30% emulsion. The first stage draw was about 1.13 (Trial 1) and 1.015 (trial 2) and second-stage draws were about 2.5 and 3.2. Although heat was not added to Roll 1 in these trials, the heat of operation would be expected to be above room temperature. As can be seen from Table 6, the yarn had excellent tenacity and elongation at speeds greater than 2000 m/min.

TABLE 6

| | Trial 1 | Trial 2 |
|---|---|---|
| Roll Speeds (m/min.): | | |
| Roll 1 | 430 | 754 |
| Roll 2 | 486 | 765 |
| Dual Roll 3 | 1226 | 2500 |

TABLE 6-continued

|  | Trial 1 | Trial 2 |
|---|---|---|
| Relax Roll | 1176 |  |
| Relax Dual Roll 4 |  | 2010 |
| Winder | 1156 | 1995 |
| Roll Temperatures (° C.) |  |  |
| Roll 1 | Unheated | Unheated |
| Roll 2 | 49 | 65 |
| Roll 3 | 135 | 165 |
| Relax Dual Roll 4 | Unheated | Unheated |
| Texturing Conditions: |  |  |
| Air Jet Temperature (° C.) | 163 | 190 |
| Air Jet Pressure (psi) | 60 | 95 |
| Interlacer Pressure (psi) | 20 | 30 |
| Yarn Properties: |  |  |
| Yarn Count (denier) | 1450 | 1328 |
| Tenacity (g/den) | 1.3 | 1.98 |
| Elongation (%) | 44 | 50.4 |

I claim:

1. A process for preparing bulk continuous fiber yarn from poly(trimethylene terephthalate) comprising:

(a) melt-spinning poly(trimethylene terephthalate) at a temperature within the range of about 250 to about 280° C. to produce a plurality of spun filaments;

(b) cooling the spun filaments;

(c) converging the spun filaments into a yarn;

(d) drawing the yarn at a first draw ratio within the range of about 1.01 to about 2 in a first drawing stage defined by at least one feed roller and at least one first draw roller, each of said at least one feed roller being unheated and each of said at least one draw roller heated to a temperature within the range of about 50 to about 150° C.;

(e) subsequently drawing the yarn at a second draw ratio of at least about 2.2 times that of the first draw ratio in a second drawing stage defined by said at least one first draw roller and at least one second draw roller, each of said at least one second draw roller heated to a temperature greater than said at least one first draw roller and within the range of about 100 to about 200° C.; and (f) winding the drawn yarn.

2. The process of claim 1 in which the first draw ratio is within the range of about 1.01 to about 1.35.

3. The process of claim 1 in which the second draw ratio is within the range of about 2.2 to about 3.4 times the first draw ratio.

4. The process of claim 1 in which the poly(trimethylene terephthalate) has an intrinsic viscosity within the range of about 0.80 to about 1.0 dl/g.

5. The process of claim 1 in which the poly(trimethylene terephthalate) is the product of condensation polymerization of the reaction product of 1,3-propane diol and at least one of terephthalic acid and dimethyl terephthalate.

* * * * *